United States Patent Office 2,867,960
Patented Jan. 13, 1959

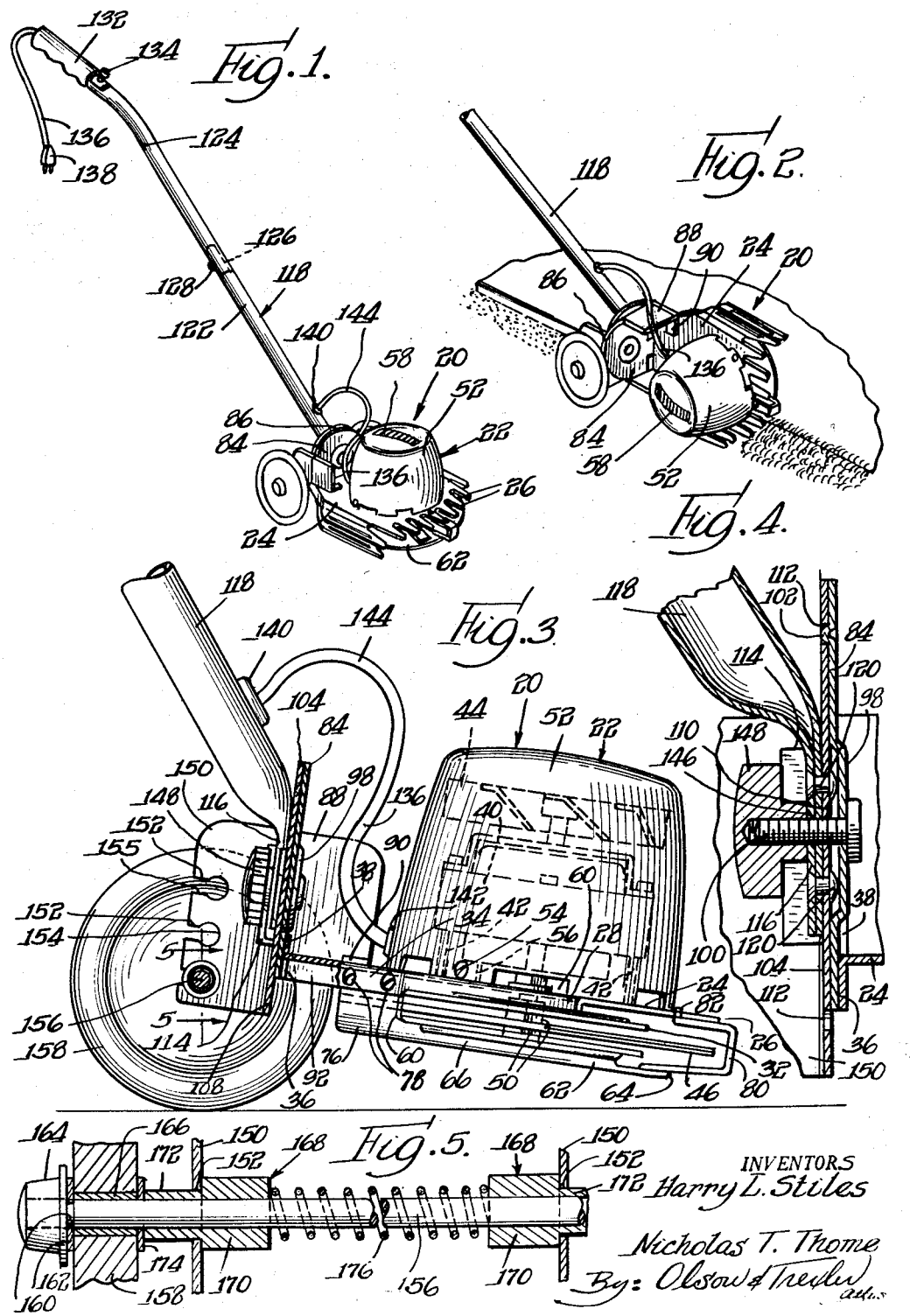

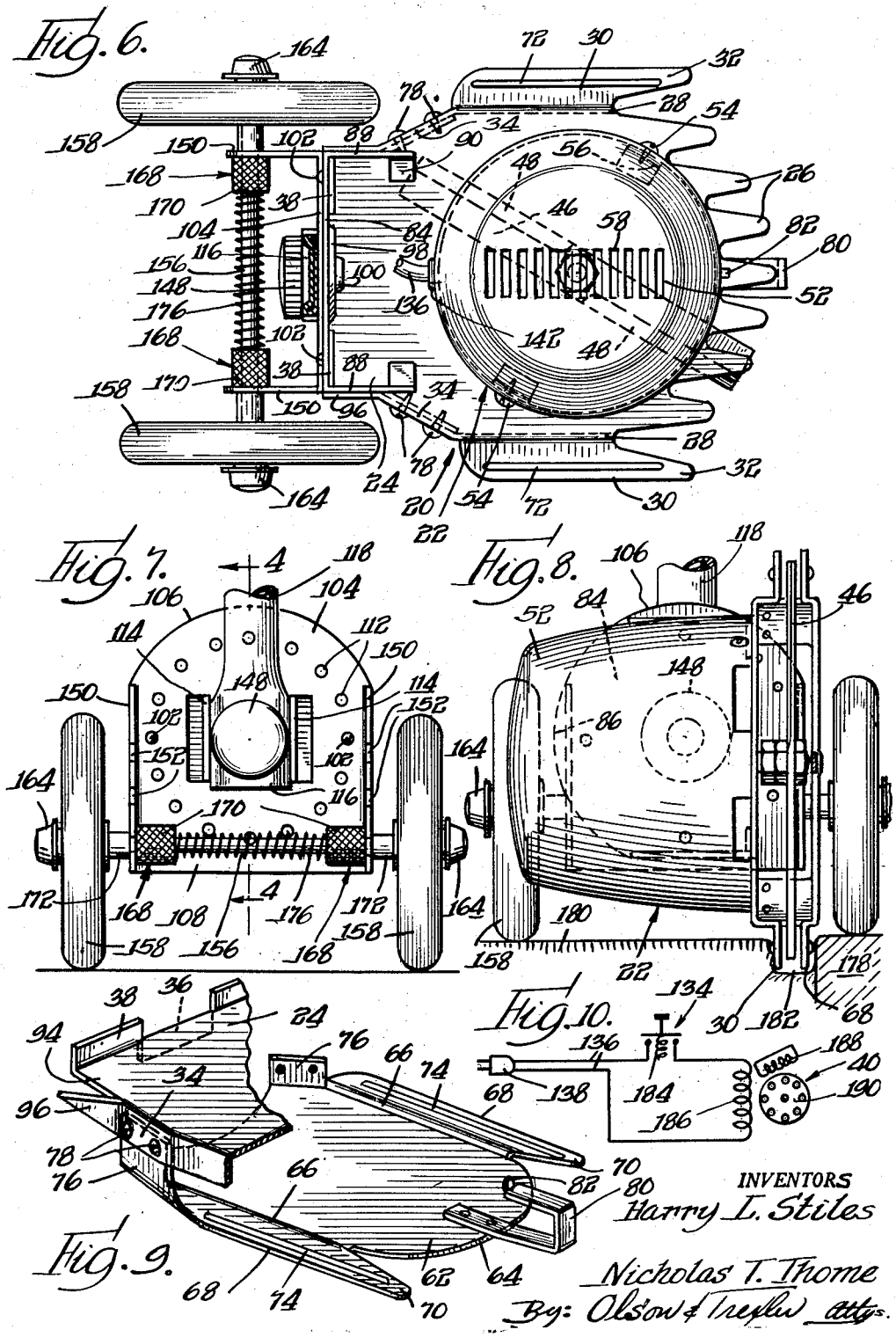

2,867,960

LAWN TRIMMER AND EDGER WITH WHEEL ADJUSTING MEANS

Harry L. Stiles and Nicholas T. Thome, Chicago, Ill., assignors to The Silex Company, Hartford, Conn., a corporation of Connecticut Application May 13, 1955, Serial No. 508,178

5 Claims. (Cl. 56—25.4)

This invention is concerned generally with a cutting or trimming device, and more particularly with a lawn trimmer and edger.

It long has been recognized that lawn mowers are incapable of cutting grass immediately adjacent the edge of a lawn, such as against a driveway, a sidewalk, or a spaced area such as for bushes or a garden. Accordingly, a great variety of lawn trimming or edging tools heretofore has been developed, and in recent years power operated trimmers have become increasingly more popular. Such power operated trimmers have generally been powered by electric motors, and to the best of our knowledge such motors always have been of the series wound A. C.–D. C. variety, commonly known as universal motors. Universal motors are capable of attaining high speeds and are fairly compact for a given power output. However, they have serious disadvantages when used in portable yard tools. They are fairly expensive, they have brushes to wear out, they are noisy in operation, and they cause considerable electrical interference resulting in buzzing of radio receivers and "snow" on television screens. Furthermore, such motors would burn out in a fairly short time if the rotors are locked, and this can happen fairly easily in the case of a lawn trimmer if a rock or stick should jam the cutting blade, and the power should not be turned off immediately. Furthermore, the open brushes and commutator necessary on such universal motors render them prone to electrical leakage in humid weather, and the possibilities of short circuit are not inconsiderable.

The most popular and satisfactory type of portable power operated lawn trimmer utilizes a single cutting blade rotatable about a generally vertical axis. The blade rotates at a high speed and cuts through the grass and the like by virtue of the high speed of the blade and the inertia of the grass, rather than by a scissors or shearing action as with the older type reel cutters. Such trimmers present considerable danger of physical injury to the user as well as the chances of electrical injury. It will be apparent that a finger or toe brought into position where it could be contacted by the rapidly rotating blade could be seriously injured or even severed. It is quite possible so to engage a finger or toe if the operator of the device injudiciously attempts to clear an object stalling the blade without first turning off the power, and it can happen in any event if the operator is careless in handling the device.

It is an object of this invention to provide a lawn trimmer or the like which is electrically powered and which is electrically safe, both to the operator and to itself, to a degree heretofore unattained in the art.

It is another object of this invention to provide an electrically powered lawn trimmer which is of economical construction. This invention contemplates attaining the foregoing objects by the provision of a shaded pole motor rather than the usual universal motor. A two pole shaded pole motor operates at substantially 3600 R. P. M., and this has been found to be a sufficiently high speed for grass cutting. It is well known that a small shaded pole motor can be energized and yet have the armature or rotor locked practically indefinitely without damage to the motor. The motor is less expensive to produce than the usual universal motor, and there is no upkeep since there are no brushes to wear out. A shaded pole motor does not cause radio and television interference, it is extremely quiet in operation, and there is substantially no chance of electrical leakage or shorting.

It is a further object of this invention to provide a power operated lawn trimmer which presents a minimum of chance of damage either to the operator or to the lawn by improper or inadvertent engagement with the cutting blade.

More specifically, it is an object of this invention to provide a power operated lawn trimmer having structure preventing the lawn trimmer from engaging the lawn or other surroundings in an improper manner.

It further is a specific object of this invention to provide an electrically powered lawn trimmer having a dead man's switch which the operator must release to de-energize the motor before he can reach the cutting blade, thereby substantially eliminating the possibility of the blade cutting the operator.

It is a further object of this invention to provide a power operated lawn trimmer having guide means for effecting close trimming along a wall or the like.

Another object of this invention is to provide a power operated lawn trimmer having means for adjusting the height of the handle so that operators of different heights may operate the same comfortably, and further having means for adjusting the height of the wheels whereby to vary the height of cut.

A further object of this invention is to provide a lawn trimmer having means for effecting cuts at an angle, such as for cutting along a slope, or next to a garden, or next to a sidewalk or the like.

Still another object of this invention is to provide a lawn trimmer which is operable also as an edging tool for cutting away dirt such as at the edge of a sidewalk or the like to cut the grass away from the sidewalk or the like and to form a small trench providing a neat appearance and discouraging further growth of grass along the sidewalk or the like.

Other and further objects and advantages of the present invention will be apparent from the following description when taken in connection with the accompanying drawings wherein:

Fig. 1 is a perspective view of a lawn trimmer and edger constructed in accordance with the principles of the invention and in the position normally used for trimming;

Fig. 2 is a fragmentary perspective view showing the device in position for edging;

Fig. 3 is an enlarged side elevational view partly in section of the operative part of the device;

Fig. 4 is a cross sectional view taken substantially along the line 4—4 of Fig. 7 showing the tilting or pivotal adjustment of the motor and cutter;

Fig. 5 is a cross sectional view substantially along the line 5—5 in Fig. 3 showing the axle and the means for attaching the same to the remainder of the device;

Fig. 6 is an enlarged top view of the device with the handle shown only in section;

Fig. 7 is an enlarged fragmentary rear view of the device;

Fig. 8 is an enlarged front view of the device in the the edging position of Fig. 2;

Fig. 9 is an enlarged exploded perspective view of the guard and guide; and

Fig. 10 is a schematic electric wiring diagram of the device.

Referring now in greater particularity to the drawings, and first to Figs. 1 and 3, there will be seen a lawn trimmer and edger device constructed in accordance with the principles of the invention and generally identified by the numeral 20. The device comprises an operating unit 22 including a sheet metal base including a plate 24. The base plate 24 (see also Figs. 6 and 9) comprises a generally flat portion having a plurality of arcuately arranged and forwardly facing fingers 26 on the front edge thereof. The base plate 24 is set downwardly at 28 along both sides, and then projects outwardly again in the form of side guides 30 having forwardly projecting fingers 32 thereon. The base plate 24 converges toward its rear edge and is provided along the sides with downwardly directed flanges 34. At the rear edge of the base plate a central flange 36 (see also Fig. 4) is turned downwardly, and a pair of flanges 38 spaced laterally thereof is turned upwardly.

A motor 40 is mounted on top of the base plate and the mounting thereof is generally conventional in nature comprising a plurality of posts and bolts 42. The motor likewise is of conventional construction for its type, but this type heretofore has not been used in lawn trimmers or the like to the best of our knowledge. The motor comprises a shaded pole, two pole motor operating at substantially 3600 R. P. M. The upper end of the motor shaft is provided with a fan 44 for cooling the motor, and the lower end of the motor shaft projects downwardly through a suitable aperture in the base plate 24. The lower end of the shaft is threaded, and a six inch blade 46 having beveled cutting edges 48 is mounted on the threaded lower end of the shaft between nuts 50.

A generally cup-shaped motor housing 52 fits over the motor and is secured to the base plate by means such as sheet metal screws 54 projecting through the motor housing and threaded into ears 56 struck up from the sheet metal base plate 24. The motor housing 52 is provided with a series of parallel slots or vents 58 across the top thereof, and the bottom is provided with spaced cut outs 60 to allow free circulation of air impelled by the fan 44 for cooling the motor.

A guard plate 62 seen in Figs. 1–3, and best seen in the perspective view of Fig. 9, is more or less complementary in shape to the base plate 24. The guard plate has a central portion provided with an arcuate front edge 64 terminating somewhat less than an inch short of the end of the cutting blade 46. The sides are provided with upwardly offset portions 66 complementary to the portions 28 of the base plate, and the guard plate then extends outwardly at 68 forming side flanges having forwardly projecting fingers thereon as indicated at 70, the side flanges and fingers being similar in shape to the side flanges 30 and fingers 32. It will be observed that the flanges 30 are provided with longitudinal stiffening ridges 72, and that the flanges 68 are similarly provided with longitudinal stiffening ridges 74. The guard plate 62 is provided along its lateral edges near the rear end thereof with upturned ears or flanges 76 secured by means such as sheet metal screws 78 to the flanges 34 of the base plate.

At the front of the guard plate there is provided a generally U-shaped bracket 80 laid on its side and secured to the upper surface of the base plate 62 by any suitable means such as rivets or welding. The upper horizontal arm of the U-shaped bracket 80 is provided with an upwardly directed tooth or tang 82 received in a complementary aperture in the base plate. The guard plate is securely mounted by means of the flanges 34, 76, and the U-shaped bracket 80 prevents the guard plate from being bent upwardly toward the base plate.

It will be understood that the U-shaped bracket 80 also serves as a bumper to prevent horizontally disposed objects from entering between the fingers 26 and the guard plate 62 where they might be engaged by the cutting blade 46 to the detriment of the objects and the blade.

The base plate 24 as previously has been noted is provided at the rear edge thereof with a downturned flange 36 and the upturned flanges 38. These three flanges are welded to the front of a mounting plate 84 of generally rectangular configuration, but having a rounded upper edge. The rounded upper edge can be seen at 86 in Figs. 1, 2 and 8. The mounting plate 84 is provided with forwardly projecting flanges on its side edges, and these flanges lie on top of the base plate 24 in the area where the base plate flares outwardly along the flanges 34. Horizontally disposed ears or lugs 90 on the bottom edges of the flanges 88 adjacent the forward edges thereof are welded to the top of the base plate. The flanges 88 project downwardly below the base plate as at 92 at the rear of the base plate in the portion indicated by the numeral 94 in Fig. 9, and rearwardly directed triangular ears 96 extending from the flanges 34 lie along the outer surfaces of the flange portions 92 and are welded thereto.

The center portion of the mounting plate 84 is displaced forwardly as at 98, as best can be seen in Figs. 3, 4 and 6. A threaded stud 100 is held in an aperture in the center of the forwardly displaced portion 98 by any suitable means such as welding. The mounting plate 84 further is provided with three rearwardly struck out protuberances 102 oriented at right angles to one another on a horizontal line through the stud 100 and vertically above the stud.

The lawn trimmer is provided also with a handle plate 104 of sheet metal, and generally complementary in shape to the mounting plate 84, having straight edges and a rounded upper edge 106, but depending lower than the mounting plate as at 108. The handle mounting plate is provided with a central aperture 110 (Fig. 4) and with a circular series of equally arcuately spaced holes 112 (Figs. 4 and 7) complementary to and selectively receiving the protuberances 102. The handle plate 104 further is provided with a pair of vertical spaced apart flanges 114 struck out from the handle plate and lying on opposite sides of the aperture 110. The flattened lower end 116 of a tubular handle 118 is formed at an obtuse angle with the remainder of the handle and is held snugly between the flanges 114 by means such as a pair of rivets 120. For shipping purposes the handle 118 preferably comprises a pair of tubular sections 122 and 124 telescoped at 126 and held together by means such as a sheet metal screw 128. The upper end of the handle is deflected somewhat backwardly as at 130 and is provided with a rubber hand grip 132. A dead man's switch 134 is provided on the handle directly in front of the handle grip 132. This switch preferably is provided with a rubber or plastic button so that when the operator holds the handle grip and depresses the button he is entirely insulated from the metal parts of the device. The so called dead man's switch 134 is of the type well known in the electrical arts which is spring biased to an open position and can be held manually in a closed position, but again will reopen upon release of the actuating member. A short length of flexible electrical cord 136 extends from the upper end of the handle and is provided with a plug 138 for connection to an extension cord. The lower end of the cord or wire 136 passes from the tubular handle through a rubber or the like grommet 140 near the lower end of the handle and then enters the motor housing through a grommet 142 (Figs. 3 and 6). It will be observed that the portion of the wire between the handle and the motor housing is provided with a looped portion 144 to allow rotation of the operating unit relative to the handle as hereinafter will be brought out.

The flattened lower end 116 of the handle is provided with an aperture 146 aligned with the aperture 110 in the handle plate, and these two aligned apertures receive the stud 100. A knurled handle or nut 148 is threaded on the outer end of the stud and clamps the handle plate against the mounting plate with the protuberances 102 entering the holes 112 for locking the handle plate and mounting plate in any desired angular position of adjustment.

The handle plate 104 is provided along its vertical edges with a pair of rearwardly directed, parallel flanges 150 which preferably are integral with the handle plate. The flanges are provided along their rear edges with a series of vertically displaced edge opening recesses 152. The recesses on the opposite flanges are aligned with one another, and in the illustrative example, are three in number, although it will be understood that a greater or lesser number of recesses could be provided. Each of the recesses 152 comprises a circular portion 154 spaced inwardly from the rear edge of the flange, and a horizontal slot portion 155 connecting the circular portion with the rear edge of the flange. These recesses receive the axle 156 on which a pair of wheels 158 is mounted.

The axle 156, as best may be seen in Fig. 5, is provided near its outer ends with slots 160 in which split C washers 162 are seated to hold the wheels against outward movement on the axle or shaft. An ornamental cap 164 preferably covers each end of the axle, and these caps conveniently are held on the ends of the axle by means of flexible metal fingers within the caps which project inwardly from the cap opening to allow the cap to be slipped onto the end of the axle, but prevent retraction thereof. Each wheel 158 preferably is provided with a metallic sleeve bearing 166 fitting over the axle.

The axle 156 is provided near its opposite ends, but inside of the wheels, with a pair of mounting members 168. Each mounting member 168 is provided with an enlarged cylindrical head 170, preferably having a knurled outer surface for convenient gripping by the fingers, and with a cylindrical shank 172 of reduced diameter. The shanks 172 are of a predetermined diameter to fit snugly within the circular portions 154 of the recesses 152, but not so snugly as to resist axial retraction therefrom. The shanks 172 will not fit through the slots 152 of the recesses, but the axle 156 can be moved transversely through any of these slots since the axle is very slightly less in diameter than the height of the slots. A washer 174 is interposed between each mounting member 168 and the adjacent wheel, and a helical spring 176 encircling the axle is compressed between the mounting members 168 to urge them outwardly against the wheels.

In the drawings the mounting members are shown as received in the circular openings 154 of the lowermost recesses 152. In some instances this may place the handle grip 132 too high for the operator of the device, or may require tipping the device backwards from the position shown in Fig. 3 to lower the handle grip, thereby trimming the grass too high. In such an event, one of the mounting members 168 is gripped by the knurled head portion 170 and is moved axially against the spring 176 out of the opening 154. The axle then can be shifted transversely through the slot 154. The mounting member at the other end of the axle is handled similarly to remove the other end of the axle from the opposite flange. The axle and wheels then can be mounted in one of the higher corresponding pairs of openings in the flanges in a reverse manner by retracting each mounting member against the spring, moving the axle into the recess, and allowing the shank to move axially under the influence of the spring into the appropriate circular opening 154. The height of the wheels on the handle plate flanges thus can be adjusted readily, and this allows for adjustment of grass cutting height, and also of the height of the handle grip 132.

The device normally will be used in the position shown in Figs. 1, 3, 6 and 7 for trimming grass. However, if it is desired to trim grass immediately adjacent the sidewalk, and simultaneously to edge the lawn, the knurled nut or handle 148 is manually threaded outwardly from its clamping position and the entire operating unit 22 is rotated about the stud to an appropriate position, such as at 90° to the initial position as illustrated in Figs. 2 and 8. With the operating unit 22 tilted to the 90° position shown in Figs. 2 and 8 and with the blade 46 therefore in a vertical plane, the wheel 158 adjacent the blade can be rolled along a sidewalk 178, while the opposite wheel is rolled along the lawn 180. The guide flanges 68 and 30 of the guard plate and the base plate respectively can be run along the surface of the ground, or on the sidewalk and lawn respectively to cut the grass in a vertical plane neatly adjacent the edge of the sidewalk. However, as specifically is illustrated in Fig. 8, the device can be tipped forwardly slightly so that the fingers 32 and 70 and the flanges 30 and 68 penetrate partway into the ground and more or less serve to separate a section of dirt at the edge of the sidewalk. The blade 46 digs into the more or less separated section of dirt and throws it from the rear of the device, thereby producing a small, neat trench 182 along the edge of the sidewalk. Thus, not only is the grass cut, but the trench 182 along the edge of the sidewalk discourages further growth immediately adjacent the edge of the sidewalk. Accordingly, a neat appearance is maintained without the necessity of edging with a spade as conventionally is done.

There is no danger to the operator in adjusting the angular position of the operating unit as heretofore has been described, or to adjusting it to any other angular position for cutting at an angle along a sidewalk or spaded area, or along a hill, or in clearing any jammed material from the blade. This is so because the operator cannot possibly reach the blade while the power is turned on, unless he makes a positive effort to hold the power on and to engage the blade at the same time. This is by virtue of the switch 134 which is normally open and must be held closed. Referring to the wiring diagram of Fig. 10, the switch 134 will be seen to be in series in the line 136, the spring holding the switch open being illustrated at 184. The shaded pole motor is conventionally illustrated at 40, including the main field winding 186, the shading coil 188, and the rotor 190. It will be apparent that the motor will not run when the switch 34 is open, and that the switch is open unless it is manually held closed.

Normally the device is utilized with the operating unit in the upright position shown in Figs. 1, 3, 6 and 7 for trimming the edge of a lawn or the like. The height of cut can be adjusted by means of the adjustable position of the wheel axle, or by tipping the device forwardly or rearwardly about the axle. In this connection, it will be noted that the device cannot be tipped sufficiently far forwardly to cause the blade to dig a "moon" in the lawn inasmuch as the guard plate 62 and the U-shaped bracket 80 would engage the lawn before the blade could do so. Thus, the guard plate and the U-shaped bracket cooperate with the wheel adjustment means in determining the height of cut. The U-shaped bracket also serves as a bumper tending to prevent horizontally disposed objects from being engaged by the blade.

The flanges and fingers along the sides of the guard plate and base plate act as guides to scrape along a wall or the like for close trimming, and also act more or less as a plow with the operating unit tilted to the 90° position previously disclosed. It will be apparent that with the operating unit tilted to this position, the device also could be used for trimming the edge of bushes and the like. The pivotal connection of the operating unit to the handle plate readily allows for such tilting, while the cooperating projections and holes associated with the mounting plate and handle plate respectively provide for positively locking the operating unit in any desired angular position. The loop 144 of the power line provides sufficient slack to allow the operating unit to be tilted without placing any strain on the power line.

Aside from the various guard means and the dead man's switch which lead to physical protection of the operator, there is substantial electrical protection of the operator. Obviously, the rubber handle grip 132 and the plastic button on the switch 134 serve to insulate the operator from the metal parts of the device. In addition, the shaded pole motor is of a type having substantially no chance of electrical leakage or short circuiting. The motor will not burn out if it is left on while jammed, as will motors of other types, and it will be appreciated that a burn out besides ruining a motor could lead to an electrical short circuit which would have potential danger to an operator. In addition to the electrical safety engendered by the use of the shaded pole motor, a device is provided which is inexpensive to produce, requires substantially no maintenance due to the lack of brushes, which is quiet in operation, and which does not cause any electrical interference causing noise in radios and "snow" on television receiver screens.

It will be understood that the specific form of the invention herein shown and described is for purposes of illustration only. Various changes in structure will no doubt occur to those skilled in the art, and are to be understood as forming a part of the invention insofar as they fall within the spirit and scope of the appended claims.

The invention is claimed as follows:

1. In a device for cutting grass and the like comprising a base, a handle on said base manually engageable by an operator for guiding said device along the ground, a motor on said base, and a rotary cutter driven by said motor and adapted for rotation about a substantially vertical axis, the combination comprising a channel-shaped member on said base having a vertical web and a pair of rearwardly projecting vertical side flanges, said side flanges having vertically spaced sets of horizontally aligned openings opening along the rear edges of said flanges through relatively restricted horizontal slots, a pair of wheels, an axle rotatably mounting said wheels, and axially movable means on said axle and engageable in said openings for detachably locking said axle in any of said sets of openings.

2. The combination as set forth in claim 1 wherein the axially movable means includes a pair of members each having a shank and an enlarged head, said pair of members having axial bores receiving said axle, and said shanks being removably received in a horizontally aligned pair of said openings and being of greater diameter than the height of said horizontal slots to resist transverse movement from said openings.

3. The combination as set forth in claim 2 wherein the shanks of said pair of members are directed axially away from one another, and further including a compressed spring encircling said axle and abutting the heads of said pair of members to urge said pair of members outwardly away from one another.

4. The combination set forth in claim 3 wherein the web of said channel shaped member is provided with an aperture, and further including a single stud passed through said aperture and operatively connected to said handle and said base to hold said handle, said base and said channel shaped member together.

5. The combination set forth in claim 4 wherein the web and the base have complementary detent means for locking said channel shaped member and said base against relative rotation about said stud.

References Cited in the file of this patent

UNITED STATES PATENTS

| | | |
|---|---|---|
| 697,415 | Spates | Apr. 8, 1902 |
| 1,028,063 | Ruch | May 28, 1912 |
| 2,404,504 | Klose | July 23, 1946 |
| 2,488,140 | Phillips et al. | Nov. 15, 1949 |
| 2,521,972 | Haglund et al. | Sept. 12, 1950 |
| 2,532,076 | Raney et al. | Nov. 28, 1950 |
| 2,556,790 | Berdan | June 12, 1951 |
| 2,608,043 | Berdan | Aug. 26, 1952 |
| 2,648,187 | Ries | Aug. 11, 1953 |
| 2,660,018 | Clemson | Nov. 24, 1953 |
| 2,728,582 | Knarzer | Dec. 27, 1955 |
| 2,774,207 | Sedgwick | Dec. 18, 1956 |
| 2,795,095 | Kaufman | June 11, 1957 |
| 2,795,915 | Miller | June 18, 1957 |
| 2,805,535 | Schaefer | Sept. 10, 1957 |

FOREIGN PATENTS

| | | |
|---|---|---|
| 143,932 | Australia | Oct. 24, 1951 |